US012646942B2

(12) United States Patent
Mimaroglu et al.

(10) Patent No.: US 12,646,942 B2
(45) Date of Patent: Jun. 2, 2026

(54) MACHINE LEARNING MODEL SELECTION FOR FORECASTING ENTITY ENERGY USAGE

(71) Applicant: Oracle International Corporation, Redwood Shores, CA (US)

(72) Inventors: Selim Mimaroglu, Arlington, VA (US); Anqi Shen, McLean, VA (US); Oren Benjamin, Arlington, VA (US); Arhan Gunel, Arlington, VA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 18/326,544

(22) Filed: May 31, 2023

(65) Prior Publication Data
US 2024/0405548 A1     Dec. 5, 2024

(51) Int. Cl.
*H02J 3/00*          (2026.01)
*H02J 103/30*        (2026.01)

(52) U.S. Cl.
CPC ........... *H02J 3/003* (2020.01); *H02J 2103/30* (2026.01)

(58) Field of Classification Search
None
See application file for complete search history.

(56) References Cited

U.S. PATENT DOCUMENTS

2019/0228481 A1     7/2019   Tella et al.
2020/0111174 A1     4/2020   Wang et al.

2022/0344934 A1     10/2022   Jayan et al.
2023/0162123 A1      5/2023   Kagan
2024/0169324 A1*     5/2024   Edwards ............ G06Q 10/1097

OTHER PUBLICATIONS

Ali et al., "A data-driven approach for multi-scale GIS-based building energy modeling for analysis, planning and support decision making", Applied Energy, vol. 279, Sep. 8, 2020.
International Search Report and Written Opinion for International Application No. PCT/US2024/029874 dated Aug. 29, 2024.

(Continued)

*Primary Examiner* — Sean Shechtman
(74) *Attorney, Agent, or Firm* — Potomac Law Group, PLLC

(57) ABSTRACT

Embodiments relate to generating time-series energy usage forecast predictions for energy consuming entities. Machine learning model(s) can be trained to forecast energy usage for different energy consuming entities. For example, a local coffee shop location and a large grocery store location are both considered retail locations, however their energy usage over days or weeks may differ significantly. Embodiments organize energy consuming entities into different entity segments and store trained machine learning models that forecast energy usage for each of these individual entity segments. For example, a given machine learning model that corresponds to a given entity segment can be trained using energy usage data for entities that match the given entity segment. A forecast manager can generate a forecast prediction for an energy consuming entity by matching the entity to a given entity segment and generating the forecast prediction using the entity segment's trained machine learning model.

20 Claims, 7 Drawing Sheets

(56)     References Cited

OTHER PUBLICATIONS

Jin et al., "GEIN An interpretable benchmarking framework towards all building types based on machine learning", Energy Elsevier, , Amsterdam, NL, vol. 260, Feb. 3, 2022.

Robinson et al., "Machine learning approaches for estimating commercial building energy consumption", Applied Energy, vol. 208, Oct. 9, 2017.

Hitchcock et al., "Small businesses don't care about energy efficiency" (and other myths about this hard-to-reach segment), https://www.energyxsolutions.com/energyx-blog/2020/09/13/myths-about-smb-energy-efficiency, Sep. 13, 2020.

Salinas et al., "DeepAR: Probabilistic Forecasting with Autoregressive Recurrent Networks," International Journal of Forecasting, vol. 36, Issue 3, pp. 1181-1191, Jul.-Sep. 2020.

* cited by examiner

700

| |
|---|
| STORING ONE OR MORE TRAINED MACHINE LEARNING MODELS |

~702

| |
|---|
| RECEIVING INPUT DATA COMPRISING TIME-SERIES ENERGY USAGE FOR AN ENTITY |

~704

| |
|---|
| MATCHING THE ENTITY TO AN ENTITY SEGMENT |

~706

| |
|---|
| SELECTING A TRAINED MACHINE LEARNING MODEL |

~708

| |
|---|
| GENERATING A FORECAST PREDICTION USING THE SELECTED TRAINED MACHINE LEARNING MODEL |

~710

MACHINE LEARNING MODEL SELECTION FOR FORECASTING ENTITY ENERGY USAGE

FIELD

The embodiments of the present disclosure generally relate to utility metering devices, and more particularly to generating time-series energy usage forecast predictions using machine learning and utility metering devices.

BACKGROUND

Energy usage data has been analyzed for different purposes. For example, non-intrusive load monitoring ("NILM") and disaggregation of various energy usage devices at a given source location has provided opportunities for improved energy infrastructure and/or energy usage patterns. NILM and disaggregation refers to taking as input total energy usage at a source location and estimating energy usage for one or more target devices that use energy at the source location. However, energy usage data can provide additional impactful signals about a variety of energy consuming entities. Implementations that can accurately forecast energy usage from a variety of entities can provide an improved understanding of overall energy usage across a region and improve energy infrastructure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
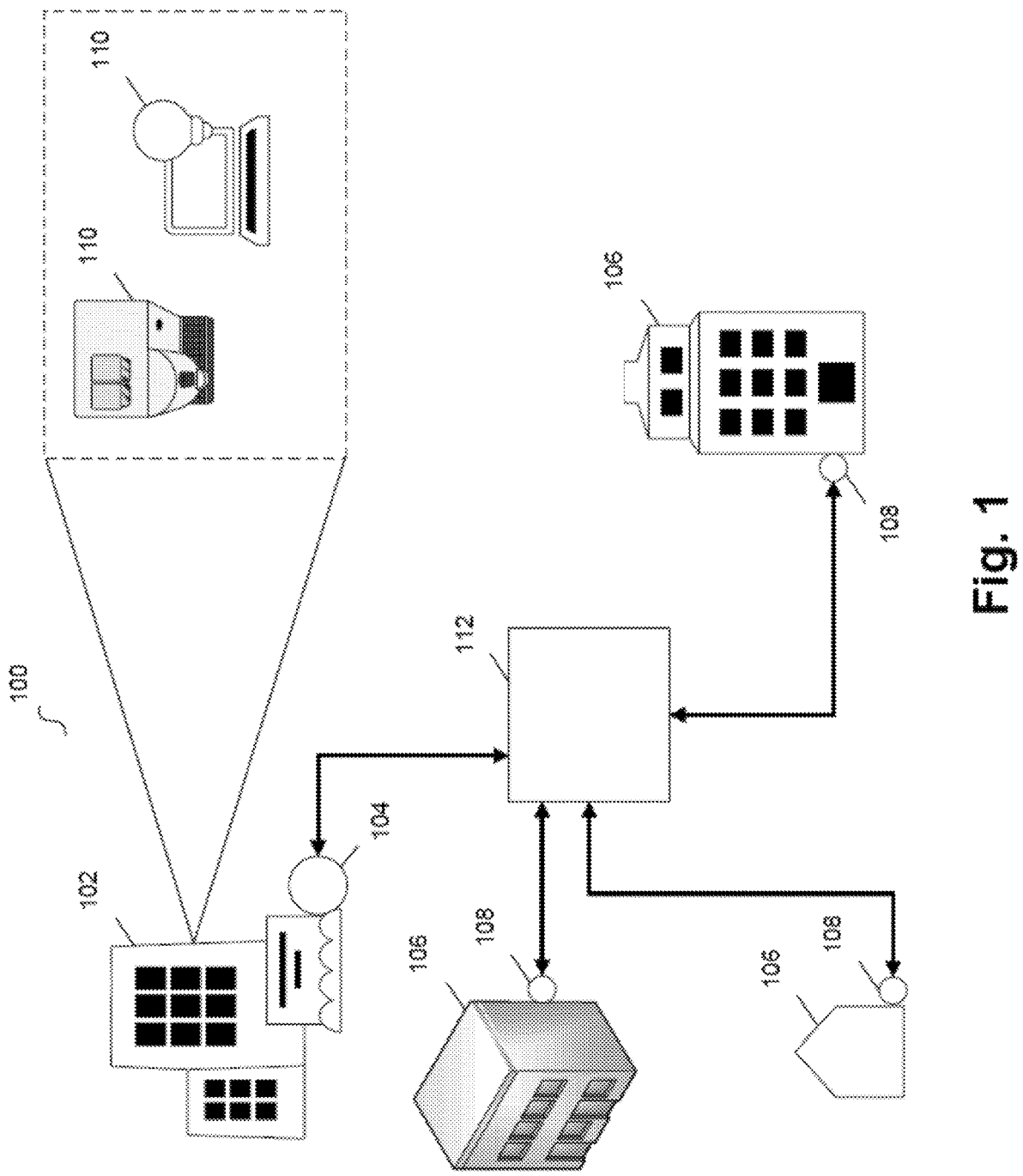
FIG. 1 illustrates a system for generating time-series energy usage forecast predictions for energy consuming entities according to an example embodiment.

Embodiments relate to generating time-series energy usage forecast predictions for energy consuming entities. Machine learning model(s) can be trained to forecast energy usage for a variety of different energy consuming entities. For example, a local coffee shop location and a large grocery store location are both considered retail locations, however their energy usage over days or weeks may differ significantly. The local coffee shop and large grocery store can comprise different energy consuming devices, operating hours, and other factors that influence energy consumption patterns. Embodiments organize energy consuming entities into different entity segments and store trained machine learning models that forecast energy usage for each of these individual entity segments. For example, a given machine learning model that corresponds to a given entity segment can be trained using energy usage data for entities that match the given entity segment. A forecast manager can generate a forecast prediction for a new energy consuming entity by matching the entity to a given entity segment and generating the forecast prediction using the entity segment's corresponding trained machine learning model. This approach can achieve accurate forecast predictions for a variety of different energy consuming entities.

The entity segments can be organized according to an organizational structure. For example, the organizational structure can be broken into enterprise categories, such as grocery store, general store, big box store, food and beverage retail, etc. Under at least a portion of the enterprise categories, the organizational structure can comprise further hierarchical structures. For example, under the food and beverage enterprise type, the hierarchy can include "food and beverage" as a root node, and one or more child nodes that correspond to other attributes for a food and beverage retail location, such subtypes (e.g., food, beverage, food and beverage), specialty subtypes (e.g., coffee shop, ice cream shop, bar/night club, etc.), and the like.

In another example, under the grocery store enterprise type, the hierarchy can include 'grocery store' as a root node, and one or more child nodes that correspond to other attributes for a grocery store, such as size (e.g., square footage, revenue or sales metric, foot traffic metric, or any other suitable size metric), automation level (e.g., automated checkout via computer vision models and customer tracking, conventional checkout, etc.), and the like. With respect to the organizational structure, entity segments can correspond to an individual enterprise category (e.g., when the category does not correspond to a hierarchical structure) or the leaf-nodes of the hierarchical structures. For example, under the food and beverage enterprise category, the specialty subcategories "coffee shop" and "ice cream shop" can comprise leaf-nodes, and thus "coffee shop" and "ice cream shop" can each comprise entity segments.

When generating a forecast for a new energy consuming entity, the attributes of the energy consuming entity can be matched to an entity segment. The matching can include selecting an enterprise category for the energy consuming entity. Next, the matching can include: a) matching the enterprise category to the energy consuming entity when the category does not comprise a hierarchical structure; or b) traversing the hierarchical structure under the selected enterprise category using attributes of the energy consuming entity until a matching leaf-node is reached. In both scenarios, the matching enterprise category or leaf-node correspond to an entity segment, and the entity segment corresponds to a trained machine learning model.

The forecast manager can generate the forecast for the new energy consuming entity using the trained machine learning model that corresponds to the matching entity segment. For example, historical energy usage (e.g., comprising a daily granularity) by the new energy consuming entity over a period of time (e.g., week, weeks, months, etc.) can be input to the trained machine learning model to generate a time-series energy usage forecast. The generated time-series energy usage forecast can cover a period of time (e.g., 1 day, 2 days, 7 days, 14 days, 21 days, etc.) and comprise any suitable granularity (e.g., daily). Because the trained machine learning model that generates the forecast is specifically selected to match the characteristics of the new energy consuming entity, implementations can achieve improved forecasting accuracy for a variety of energy consuming entities.

Some embodiments implement an architecture on a deep learning framework. Implementations of the architecture are also extensible and can be tailored with respect to the size of the input and output. The functionality of the deep learning framework, such as initialization of the layers, the implemented optimizer, regularization of values, dropout, and the like can be utilized, removed, or adjusted.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for generating time-series energy usage forecast predictions for energy consuming entities according to an example embodiment. System 100 includes entity location 102, meter 104, entity locations 106, meters 108, entity energy consumers 110, and network node 112. Entity location 102 can be any suitable enterprise location that includes or is otherwise associated with devices that consume or produce energy, such as grocery stores, restaurants, car mechanic enterprise locations, coffee shops, big box stores, other retail stores, and other suitable enterprise locations.

In some embodiments, entity energy consumers 110 at entity location 102 can include electrical devices and/or appliances that consume energy, such as air conditioners, heaters, refrigerators/freezers, televisions, computing devices, industrial devices, devices comprising batteries, lighting systems, audio systems, cooking appliances, exhaust systems, and the like. For example, entity location 102 can be supplied with power (e.g., electricity), and the energy consuming devices can draw from the power supplied to entity location 102. In some embodiments, entity location 102 is an enterprise location (e.g., retail store, services business, etc.) and the power to the enterprise location is supplied from an electric power grid, a local power source (e.g., solar panels), a combination of these, or any other suitable source.

In some embodiments, meter 104 can be used to monitor the energy usage (e.g., electricity usage) at entity location 102. For example, meter 104 can be a smart meter, an advanced metering infrastructure ("AMI") meter, an automatic meter reading ("AMR") meter, a simple energy usage meter, and the like. In some embodiments, meter 104 can transmit information about the energy usage at entity location 102 to a central power system, a supplier, a third party, or any other suitable entity. For example, meter 104 can implement two-way communication with an entity in order to communicate the energy usage at entity location 102. In some embodiments, meter 104 may implement one-way communication with an entity, where meter readings are transmitted to the entity.

In some embodiments, meter 104 can communicate over wired communication links and/or wireless communication links, and can leverage wireless communication protocols (e.g., cellular technology), Wi-Fi, wireless ad hoc networks over Wi-Fi, wireless mesh networks, low power long range wireless ("LoRa"), ZigBee, Wi-SUN, wireless local area networks, wired local area networks, Home Area Network (HAN), including IEEE 2030.5, and the like. Energy consuming devices can use energy at entity location 102, and meter 104 can monitor the energy usage for the entity location and report the corresponding data (e.g., to network node 112).

In some embodiments, entity locations 106 and meters 108 can be similar to entity location 102 and meter 104. For example, networking node 112 can receive energy usage information about entity location 102 and entity locations 106 from meter 104 and meters 106. In some embodiments, network node 112 can be part of a central power system, a supplier, a power grid, an analytics service provider, a third-party entity, or any other suitable entity. However, entity location 102 and entity locations 106 may represent different types of enterprise locations.

In an example, entity location 102 can represent at big box store, while entity locations 106 can represent a coffee shop, a grocery store, and a restaurant. Each of these enterprise locations can comprise different conditions and/or scenarios with respect to energy usage. For example, the enterprise locations can comprise different sizes, operating hours, combinations of energy consuming devices, weather conditions, customer/consumer demand patterns, and the like.

Implementations match energy consuming entities (e.g., entity location 102 and/or entity locations 106) to entity segments. In this example, each matched entity segment comprises a corresponding trained machine learning model. A time-series energy forecast can be generated for a given energy consuming entity by matching the given energy consuming entity to an entity segment, and providing input data (e.g., historical time-series energy usage data for the given entity) to the trained machine learning model that corresponds to the matched entity segment. The trained machine learning model can generate a time-series energy usage forecast for the given energy consuming entity over a target time horizon (e.g., 1 day, 2 days, 7 days, 14 days, 21 days, etc.).

The following description includes recitations of a criterion or criteria. These terms are used interchangeably throughout the disclosure, the scope of criteria is intended to include the scope of criterion, and the scope of criterion is intended to include the scope of criteria.

Figure 2:
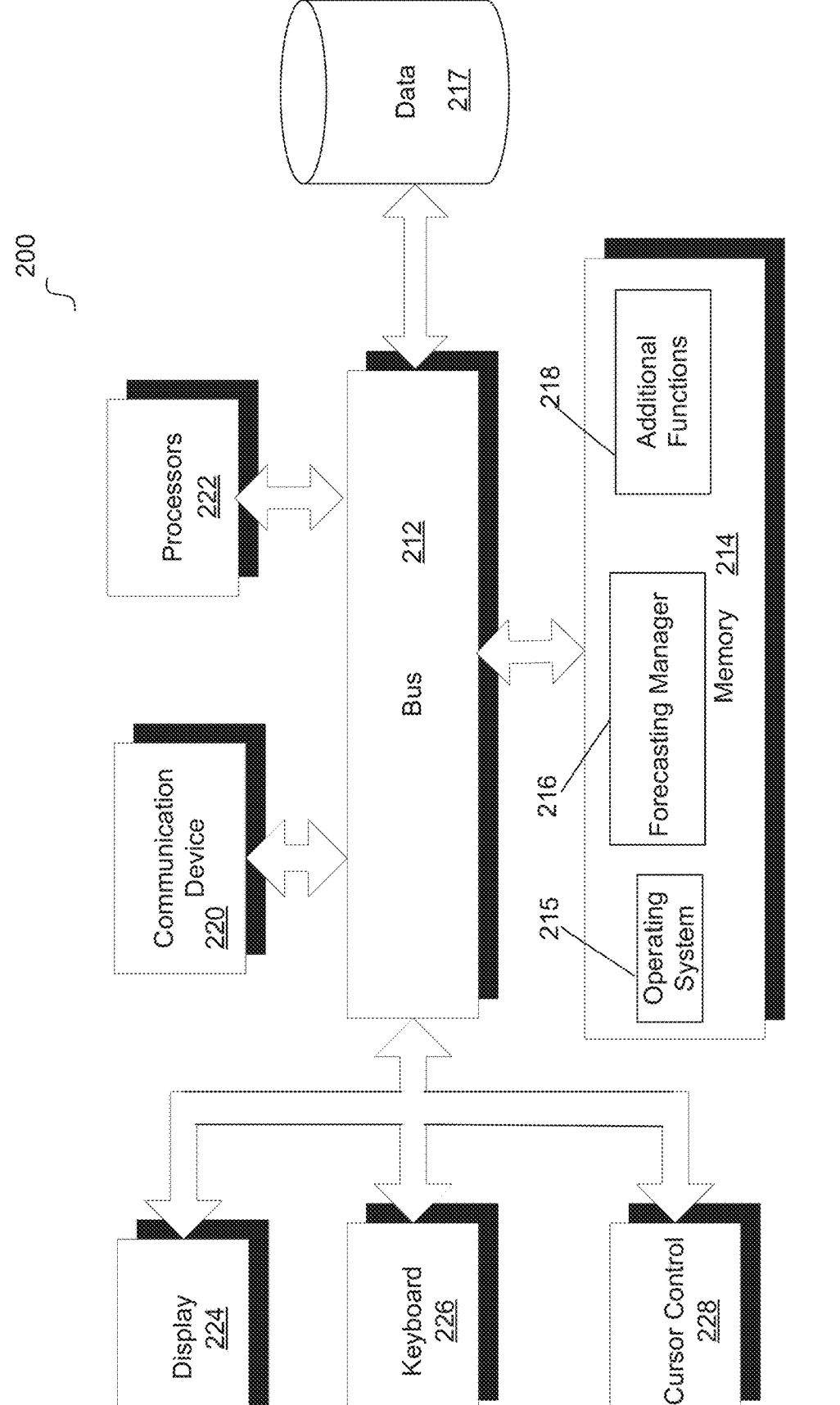
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, forecasting manager 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a forecasting manager 216 that implements the entity energy usage forecasting disclosed herein, as well as other applications modules 218. Operating system 215 provides operating system functionality for system 200. In some instances, forecasting manager 216 may be implemented as an in-memory configuration. In some implementations, when system 200 executes the functionality of forecasting manager 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Utilities Customer Cloud Service, Oracle® Cloud Infrastructure, Oracle® Cloud Platform, Oracle® Cloud Applications, for example. Forecasting manager 216, other applications module 218, and any other suitable component of system 200 can include various modules of Oracle® Data Science Cloud Service, Oracle® Data Integration Service, or other suitable Oracle® products or services.

A database 217 is coupled to bus 212 to provide centralized storage for modules 216 and 218 and to store, for example, data received by forecasting manager 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
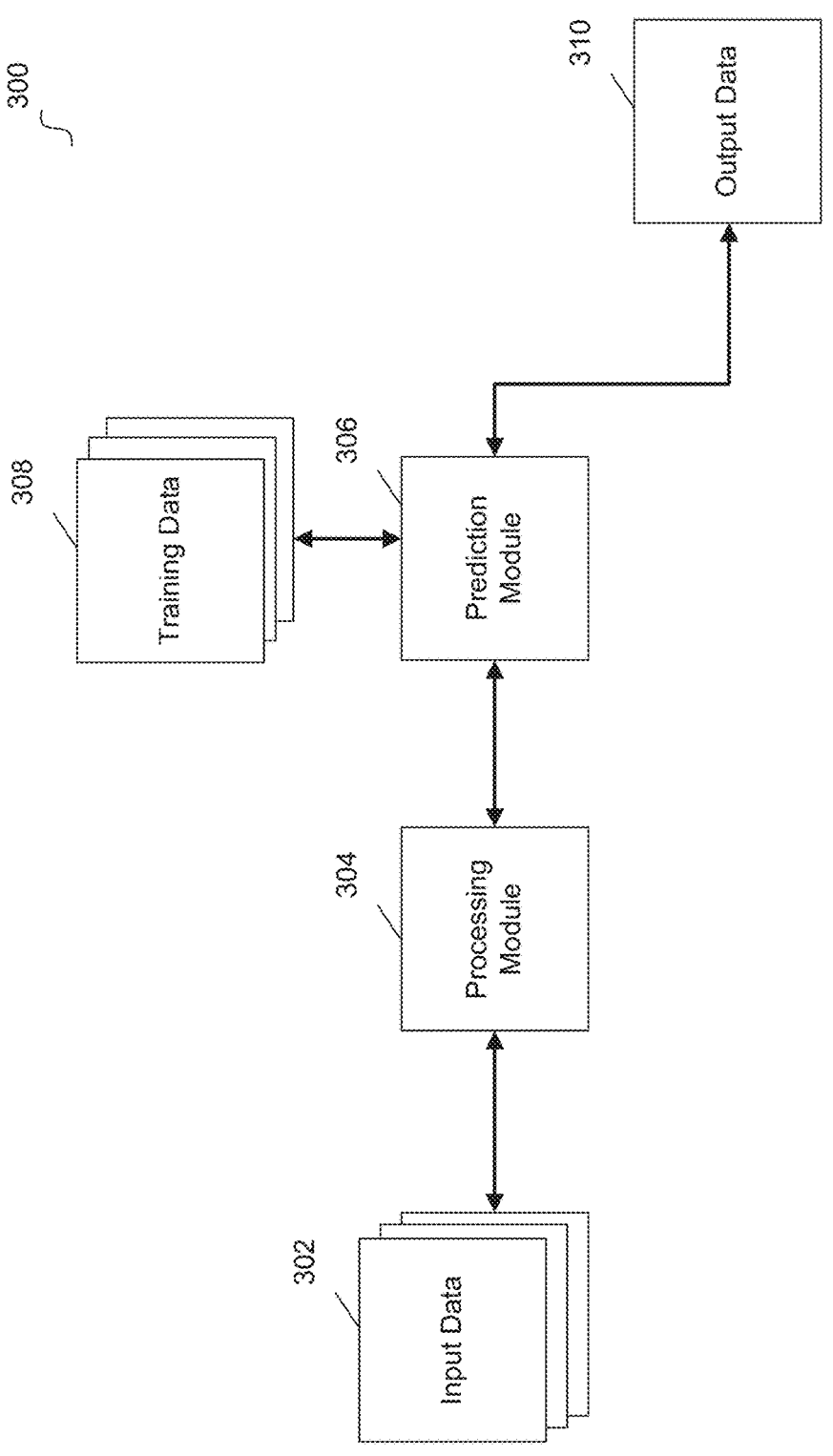
FIG. 3 illustrates a diagram for using machine learning model(s) to generate time-series energy usage forecast predictions for energy consuming entities according to an example embodiment.

FIG. 3 illustrates a diagram for using machine learning model(s) to generate time-series energy usage forecast predictions for energy consuming entities according to an example embodiment. System 300 includes input data 302, processing module 304, prediction module 306, training data 308, analytics module 310, and output data 312. Input data 302 can include time-series energy usage from an enterprise location (e.g., energy consuming entity), and the data can be processed by processing module 304. For example, processing module 304 can process input data 302 to generate features based on the input data.

Prediction module 306 can be multiple machine learning modules (e.g., neural networks, etc.) that are trained by training data 308. For example, training data 308 can include data, such as energy usage data values from a plurality of enterprise locations (e.g., entity locations 102 and 106 from FIG. 1). In some embodiments, the output from processing module 304, such as the processed input, can be fed as input to prediction module 306. Prediction module 306 can generate time-series energy usage forecasts comprising predicted energy usage for the enterprise location (e.g., daily energy usage predictions over 1 day, 2 days, 7 days, 14 days, 21 days, and the like).

For a given enterprise location and instance of input data 302, processing module 304 can select one of the machine learning models comprised by prediction module 306. In an example, the multiple machine learning models can be trained using different sets of training data 308. Processing module 304 can match the given enterprise location to an entity segment using attributes of the enterprise location. The selected machine learning model of prediction module 306 can comprise a predefined correspondence to the matching entity segment.

Embodiments use machine learning models, such as neural networks, to forecast energy usage for enterprise locations. Neural networks can include multiple nodes called neurons that are connected to other neurons via links or synapses. Some implementations of neural networks can be aimed at classification tasks and/or can be trained under supervised learning techniques. In many cases, training data can include features that help in achieving a prediction task (e.g., energy usage forecasting). In some embodiments, neurons in a trained neural network can perform a small mathematical operation on given input data, where their corresponding weights (or relevance) can be used to produce an operand (e.g., produced in part by applying a non-linearity) to be passed further into the network or given as the output. A synapse can connect two neurons with a corresponding weight/relevance. Prediction model 306 from FIG. 3 can be one or more neural networks.

In some embodiments, a neural network can be used to learn trends within energy usage data values. For example, training data 308 can include features and these features can be used by a neural network (or other learning model) to identify trends and predict household information from overall household energy usage. In some embodiments, once a model is trained/ready it can be deployed. Embodiments can be implemented with a number of products or services (e.g., Oracle® products or services).

In some embodiments, the design of prediction module 306 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. The different trained machine learning models of prediction module 306 can comprise the same machine learning architecture, similar machine learning architecture, and/or different machine learning architecture. The machine learning model(s) can comprise a deep recurrent neural network (e.g., DeepAR, etc.), for example that utilize a supervised learning algorithm for generating time-series forecasts.

Prediction module 306 can include any other suitable machine learning models or components. In some examples, a Bayesian network can be similarly implemented, or other types of supervised learning models. For example, a support vector machine can be implemented, in some instances along with one or more kernels (e.g., gaussian kernel, linear kernel, and the like). In some embodiments, prediction module 306 of FIG. 3 can be multiple models stacked, for example with the output of a first model feeding into the input of a second model, with the output of multiple models being combined, or in any other suitable manner. Some implementations can include a number of layers of prediction models.

In some embodiments, testing instances can be given to the model to calculate its accuracy. For example, a portion of training data 308/energy usage data can be reserved for testing the trained model (e.g., rather than training the model). The accuracy measurement can be used to tune prediction module 306. In some embodiments, accuracy assessment can be based on a subset of the training data/ processed data. For example, a subset of the data can be used to assess the accuracy of a trained model (e.g., a 70%, 15%, and 15% ratio for training, validation, and testing, and the like). In some embodiments, the data can be randomly selected for the testing and training segments over various iterations of the testing.

In some embodiments, when testing, a trained model can output an energy usage forecast for a given enterprise location based on input for the given enterprise location (e.g., instance of testing data). Because the enterprise location energy usage data is known for the given input/testing instance, the predicted value can be compared to the known value to generate an accuracy metric. Based on testing the trained model using multiple instances of testing data, an accuracy for the trained model can be assessed.

In some embodiments, the design of prediction module 306 can be tuned based on accuracy calculations during training, retraining, and/or updated training. For example, tuning can include adjusting a number of hidden layers in a neural network, adjusting a kernel calculation (e.g., used to implement a support vector machine or neural network), and the like. This tuning can also include adjusting/selecting features used by the machine learning model, adjustments to the processing of input data, and the like. Embodiments include implementing various tuning configurations (e.g., different versions of the machine learning model and features) while training/calculating accuracy in order to arrive at a configuration for prediction module 306 that, when trained, achieves desired performance (e.g., performs predictions at a desired level of accuracy, runs according to desired resource utilization/time metrics, and the like). In some embodiments, trained model(s) can be saved or stored for further use and for preserving its state. For example, the training of prediction module 306 can be performed "offline" and the trained model(s) can then be stored and used as needed to achieve time and resource efficient data prediction.

Embodiments of prediction module 306 are trained to forecast enterprise location energy usage, for example at a daily granularity over a time horizon (e.g., a week, weeks, a month, etc.). The different machine learning models of prediction module 306 can be trained using different sets of training data 308. For example, energy consuming entities (e.g., enterprise locations) can be organized according to an organizational structure that comprises entity segments. Each entity segment can correspond to a trained machine learning model that is trained using a set of training data 308 from energy consuming entities that match the entity segment.

For example, a first entity segment can comprise a subspecialty, such as a coffee shop, and the corresponding machine learning model can be trained using a set of training data 308 that comprises energy usage data values for coffee shops. A second entity segment can comprise a broad category, such as a big box store, and the corresponding machine learning model can be trained using a set of training data 308 that comprises energy usage data values for big box stores.

Energy consuming entities, such as enterprise locations (e.g., retail locations, auto mechanics, etc.) can be organized according to entity segments. Each entity segment can cover a set of enterprise locations (e.g., coffee shop, large grocery store, small grocery store, bar/night club, big box store, etc.). This segmentation can configure the training of machine learning models such that the trained model(s) can accurately forecast energy usage among enterprise locations that match the model's entity segment. Because enterprise locations have a large degree of variety, different segment characteristics may be effective in different scenarios.

Figure 4:
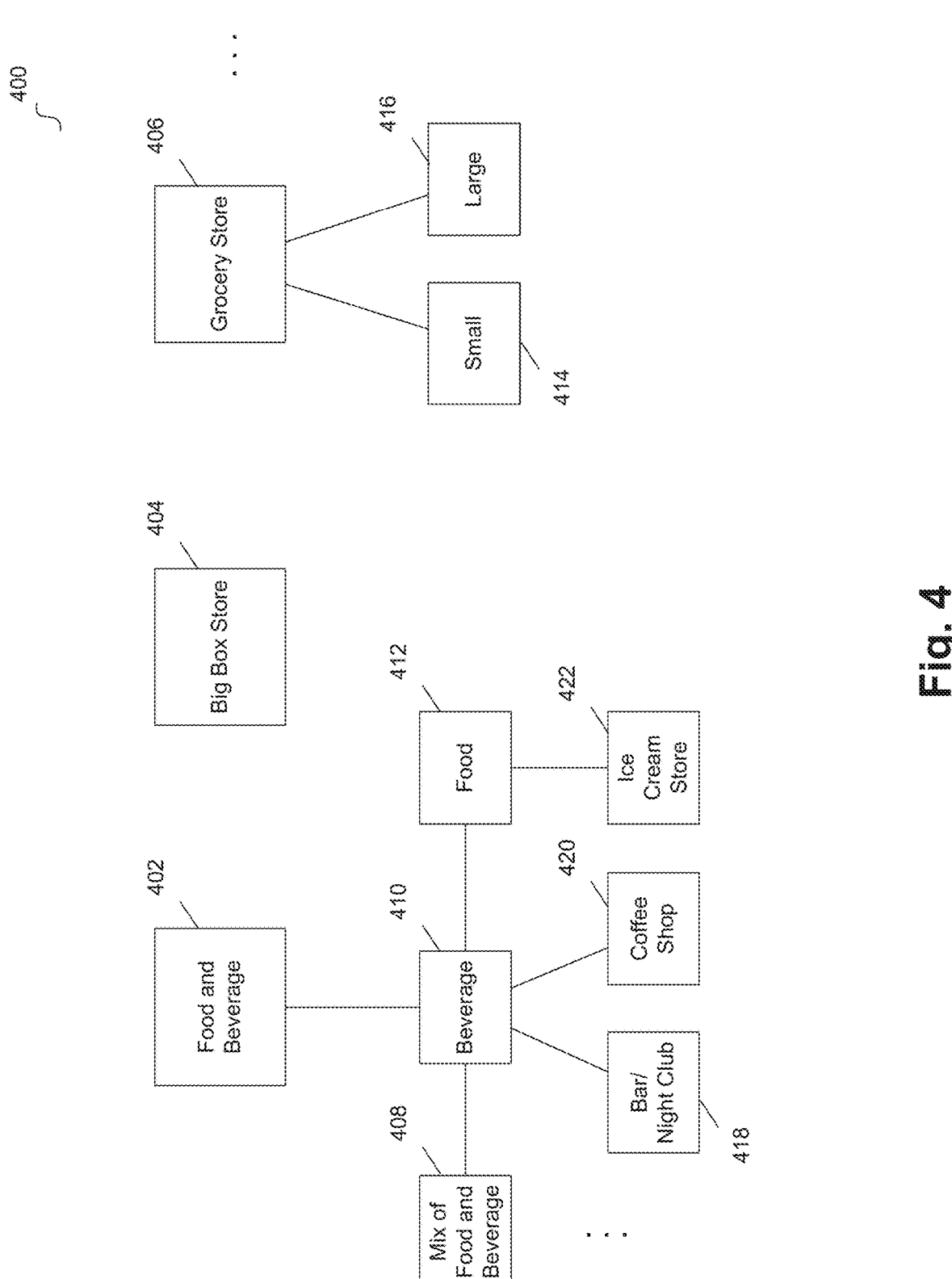
FIG. 4 illustrates an example organizational structure for entity segments according to example embodiments.

FIG. 4 illustrates an example organizational structure for entity segments according to example embodiments. Organizational structure 400 includes categories 402, 404, and 406, intermediate nodes 408, 410, and 412, and leaf-nodes 414, 416, 418, 420, 422. The illustrated organizational structure 400 is a simplified example, and implemented organizational structures can be larger, or in some instances much larger. Organizational structure 400 comprises a first tier of categories 402, food and beverage, 404, big box store, and 406, grocery store. These organizational categories can comprise a first organizational component of the entity segments.

Categories 402 and 406 comprise hierarchical structures beneath them. For example, the hierarchical structure beneath category 402 comprises intermediate nodes 408, 410, and 412, and leaf-nodes 418, 420, and 422. The hierarchical structure beneath category 406 comprises leaf-nodes 414 and 416. These hierarchical structures further subcategorize categories 402 and 406. For example, a given energy consuming entity that falls under category 402 can be matched to one of leaf-nodes 418, 420, and 422. Each of leaf-nodes 418, 420, and 422 can represent entity segments. For example, machine learning models can be trained for each entity segment using training data from energy consuming entities that match the segment's leaf-node.

Category 404 does not comprise a hierarchical structure beneath it. In some examples, a broad category may be a suitable entity segment for a corresponding trained machine learning model. For example, a machine learning model trained using training data comprising time-series energy usage for big box stores may be effective at forecasting time-series energy usage for big box stores in general. In this example, the energy consuming entities that fall under the broad category of big box store may be similar enough such that the entity segment need not be more specific (e.g., segmented on store size, etc.).

On the other hand, the broad category of food and beverage (category 402) may encompass many varieties of food and beverage enterprise locations, such as enterprise locations that sell a mix of food and beverage (represented by intermediate node 408), enterprise locations that sell predominantly beverages (represented by intermediate node 410), and enterprise locations that sell predominantly food (represented by intermedia node 412). Accordingly, a machine learning model that trains broadly on energy usage data values for food and beverage energy consuming entities may not effectively forecast for the large variety of different kinds of food and beverage enterprise locations.

Category 402 is further subdivided such that entity segments (leaf-nodes) are tailored to encompass a less diverse set of energy consuming entities. For example, the leaf-node 418, bar/night club, leaf-node 420, coffee shop, and leaf-node 422, ice cream store, can represent a relatively small amount of diversity with respect to the energy consuming entities that fall under these subspecialties. Accordingly, machine learning models that are trained using training data (e.g., historical energy usage data values) from these small sets of energy consuming entities can successfully forecast for other energy consuming entities that match the entity segment. In other words, a machine learning model that trains on time-series energy usage data values from coffee shops can effectively forecast time-series energy usage for new/unseen coffee shops. Similarly, a machine learning model that trains on time-series energy usage data values from bars/night clubs can effectively forecast time-series energy usage for new/unseen bars/night clubs.

In this example, a machine learning model that trains on time-series energy usage data values from coffee shops and bars/night clubs may be less effective at forecasting energy usage values for both coffee shops and bars/night clubs due to the inherent differences in the energy usage dynamics for these enterprise locations. For this reason, the food and beverage category (category 402) comprises leaf-nodes 418 and 420 to effectively train machine learning models to forecast time-series energy usage for both coffee shops and bars/nightclubs.

Figure 5:
FIG. 5 illustrates an energy usage graph for multiple energy consuming entities according to example embodiments.
Figure 5:
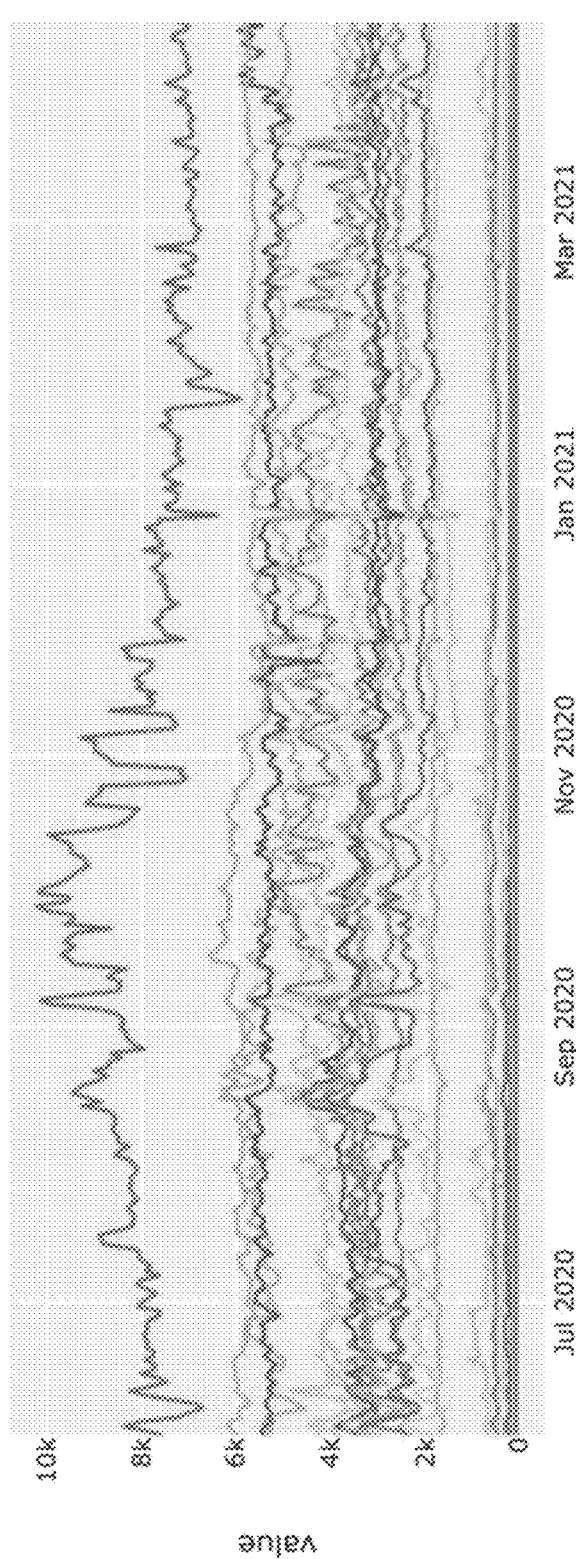

Similarly, category 406, grocery store, is subdivided into leaf-node 414, representing small size grocery stores, and leaf-node 416, representing large size grocery stores. FIG. 5 illustrates an energy usage graph for multiple energy consuming entities according to example embodiments. Graph 500 depicts time-series energy usage values for different grocery store locations. As illustrated, while grocery stores theoretically comprise some similarities in their energy usage profiles, the observed energy usage values vary widely. Accordingly, it may be beneficial to further subcategorize grocery stores to more effectively forecast time-series energy usage.

A machine learning model that corresponds to the leaf-node 414 can train on time-series energy usage data values from small grocery stores, and a machine learning model that corresponds to the leaf-node 416 can train on time-series energy usage data values from large grocery stores. These two machine learning models, trained on different training data, can more effectively forecast time-series energy usage for grocery stores of different sizes.

In some implementations, a new energy consuming entity (e.g., enterprise location) can be matched to a segment entity from organizational structure 400. For example, the segment entities from the simplified organizational structure comprise: bar/night club (leaf-node 418), coffee shop (leaf-node 420), ice cream store (leaf-node 422), big box store (category 404), small grocery store (leaf-node 414), and large grocery store (leaf-node 416). Attributes of the new energy consuming entity (e.g., business type, product/service type, such as coffee sales, food sales, etc., square footage, customer traffic metrics, revenue/sales metrics, etc.) can be used to select a matching segment entity from organizational structure 400.

For example, the new energy consuming entity, such as a coffee shop, can be compared to categories 402, 404, and 406 to initially select a category for the new entity. In this example, the new coffee shop matches category 402, food and beverage. If the new entity matched category 404, big box store, this category would be selected as the matching segment entity for the new energy consuming entity, as category 404 comprises no subdivisions/hierarchical structure and represents an entity segment itself.

Since category 402 comprises further subdivisions, the hierarchical structure beneath category 402 can be traversed using the attributes of the new energy consuming entity until a leaf-node is reached. For example, among intermedia nodes 408, 410, and 412, intermediate node 410 (predominantly beverage) can be selected as a match. Among the leaf-nodes for intermedia node 410, leaf-node 420, coffee shop, can be selected as a match. Accordingly, leaf-node 420, coffee shop, can be selected as the entity segment for the new energy consuming entity.

In this example, the machine learning model that corresponds to leaf-node 420 (e.g., trained using coffee shop time-series energy usage data values) can be selected for predicting the time-series energy usage forecast for the new energy consuming entity. For example, input data for the new energy consuming entity, such as time-series energy usage over a period of time (e.g., a week, two weeks, a month, months, a year, etc.) at a given granularity (e.g., hourly, daily, etc.) can be provided to the trained machine learning model, and the machine learning model can generate a predicted time-series energy usage forecast, at the given granularity (e.g., daily) over a target time horizon (e.g., week, weeks, month, etc.).

In some implementations, weather data can be included in the training of the machine learning model (e.g., training data) and the input data (e.g., historical time-series energy usage data of the new energy consuming entity). Example weather data includes temperature/temperature ranges, precipitation, humidity, dew point, pressure, and the like. In some implementations, the trained machine learning model can be provided forecasted weather data (e.g., future weather data) over the time horizon for the energy usage forecast prediction (e.g., week, weeks, month, etc.).

Figure 6:
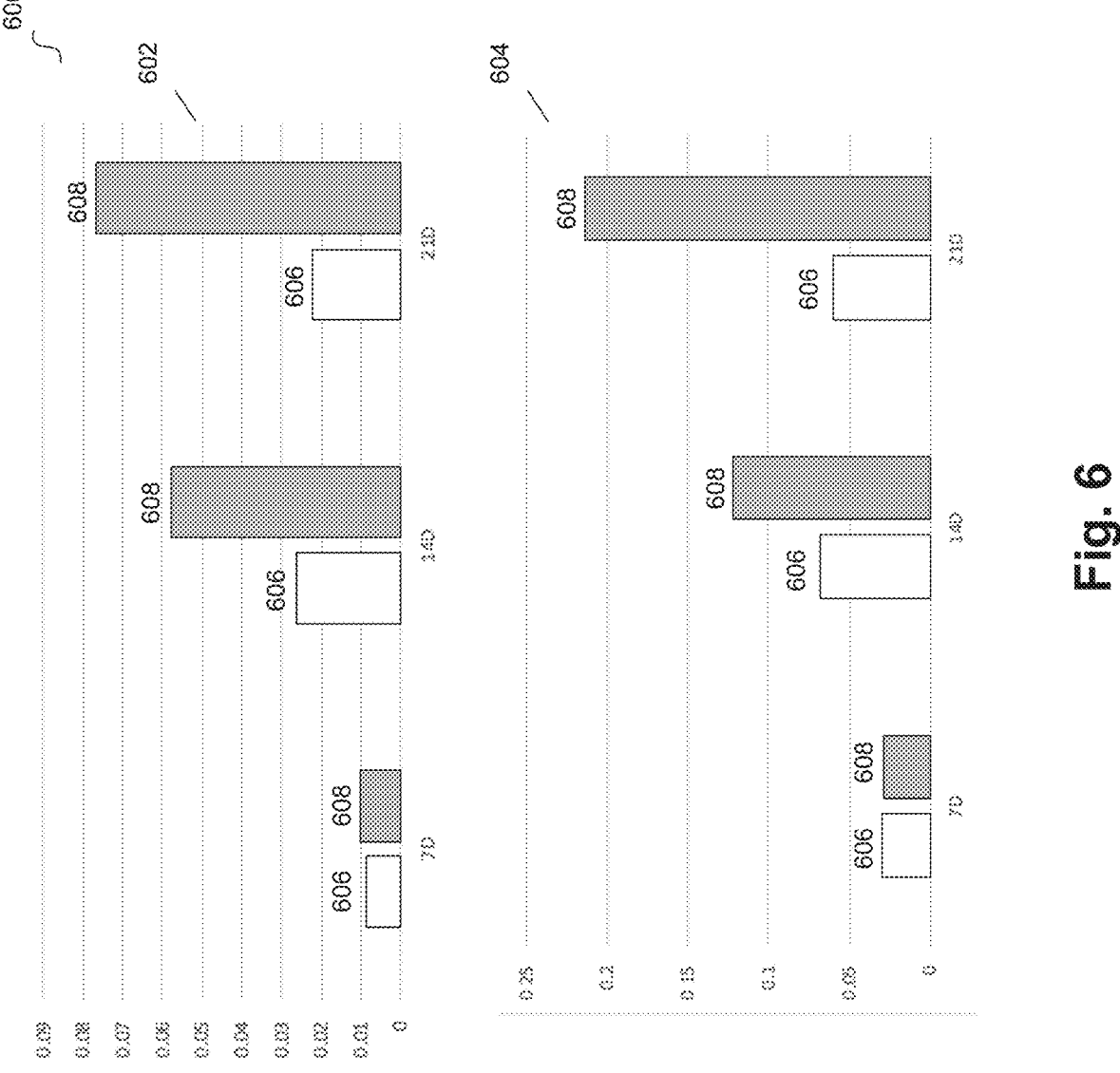
FIG. 6 illustrates energy usage graphs that compare forecast predictions according to example embodiments.

Implementations can effectively forecast time-series energy usage data values for specific energy consuming entities, such as a coffee shop, using the matched entity segments and corresponding trained machine learning models. FIG. 6 illustrates energy usage graphs that compare forecast predictions according to example embodiments. Diagram 600 includes graphs 602 and 604, machine learning model forecast data 606, and tiling data 608. Graphs 602 and 604 represent an accuracy metric, namely energy bill values for coffee shops (e.g., based on energy usage over the time horizon and energy rate) across different time horizons, 7 days, 14 days, and 21 days. Implementations forecast energy bill values for multiple and different coffee shop locations.

The accuracy of two techniques was measured: a) an implementation of a trained machine learning model (e.g., DeepAR) using time-series energy usage values for coffee shops and weather data; and b) a tiling technique. The tiling technique represents a widely used industry practice for enterprise location energy usage forecasting. The tiling technique is simply a copy and paste technique that forecasts energy usage for the next 7 days, 14 days, and/or 21 days using the observed energy usage from the previous 7 days, 14 days, and/or 21 days.

Machine learning model forecast data 606 demonstrates the accuracy of implementations of the machine learning model technique and tiling data 608 demonstrates the accuracy of the tiling technique. With regard to the implemented forecasting for multiple and different coffee shops, the following accuracy metrics can be used to evaluate the results:

rMSE: root mean squared error sMAPE: symmetric mean absolute percentage error bill_abs_pct_error: energy bill absolute percent error: abs (bill_forecast_sum/bill_target_sum−1)

bill_abs_error: energy bill absolute error: abs (bill_forecast_sum-bill_target_sum)

bill_pct_error: energy bill percent Error: bill_forecast_sum/bill_target_sum−1

Graph 602 illustrates bill_abs_pct_error at 50% (e.g., median coffee shop) and graph 604 illustrates bill_abs_pct_error at 90%. The machine learning technique, represented by machine learning model forecast data 606 (white bars), significantly outperforms the tiling technique, represented by tiling data 608 (grey bars), for 14 day and 21 day time horizons, as lower error numbers correspond to better performance.

The below table represents results that utilize a machine learning model (e.g., DeepAR) trained using energy usage data values from coffee shops and weather data where bill_abs_error_0.5 represents 50th percentile of the bill_abs_error and bill_abs_error_0.9 represents the 90th percentile of the same error metric:

| Metrics from ML | 7 Day | 14 Day | 21 D |
|---|---|---|---|
| rMSE | 27.92 kWh | 31.968 kWh | 29.849 kWh |
| sMAPE | 0.102 | 0.121 | 0.113 |
| bill_abs_error_0.5 | 51.75 kWh | 157.54 kWh | 138.36 kWh |
| bill_abs_error_0.9 | 158.22 kWh | 476.85 kWh | 457.68 kWh |
| bill_abs_pct_error_0.5 | 0.0086 | 0.026 | 0.022 |
| bill_abs_pct_error_0.9 | 0.030 | 0.068 | 0.060 |
| bill_pct_error_0.5 | −0.003 | 0.019 | 0.015 |

The below table represents results using the tiling technique:

| Metrics from Tiling | 7 D | 14 D | 21 D |
|---|---|---|---|
| rMSE | 33.090 kWh | 51.303 kWh | 51.643 kWh |
| sMAPE | 0.100 | 0.183 | 0.193 |
| bill_abs_error_0.5 | 63.43 kWh | 407.114 kWh | 562.87 kWh |
| bill_abs_error_0.9 | 204.00 kWh | 802.58 kWh | 1171.63 kWh |
| bill_abs_pct_error_0.5 | 0.010 | 0.058 | 0.077 |
| bill_abs_pct_error_0.9 | 0.029 | 0.122 | 0.2143 |
| bill_pct_error_0.5 | 0.006 | −0.057 | −0.027 |

The machine learning technique of embodiments performed significantly better than the tiling technique. For example, the 50th percentile (or median of coffee shops) comprise a 7-day forecast energy usage bill value with a 0.8% error, 14-day forecast with a 2.6% error, and 21-day forecast with a 2.2% error. Similarly, 90th percentile of coffee shops comprise a 7-day forecast energy usage bill value with a 3.0% error, 14-day forecast with a 6.8% error, and 21-day forecast with a 6.0% error. This represents improved performance over the tiling techniques. For example, for the bill_abs_pct_error at 50% (median coffee shop), the machine learning techniques are 350% more accurate than the tiling techniques on a 21-day forecast horizon.

Embodiments also support improvements to electrical grid infrastructure. Because embodiments can accurately forecast energy usage for a diverse variety of enterprise locations, which have traditionally lacked accurate forecasting, utilities can configure electric grids to meet the expected load. In practice, the demand for electricity experiences peak loads that can cause high costs to utilities that implement electric grids as well as high environmental costs. To address this issue, utilities aim to better distribute electricity demand and alleviate the risks of peak loads. Because much of the energy usage from enterprise locations is not flexible (due to the constraints associated with running an enterprise) implementations can aim to distribute other types of load around the expected load from enterprise locations. In other words, implementations can recognize and classify the expected load from enterprise locations and organize grid capacity and capabilities to efficiently serve these energy consuming entities.

Implementations can also leverage energy usage forecasting to provide enterprise locations high bill alerts. Such alerts can help the enterprise location manage energy bills and cause the enterprise location to consume less energy in the near-term future, thus reducing load on the energy grid.

Figure 7:
FIG. 7 illustrates a flow diagram for generating time-series energy usage forecast predictions for energy consuming entities according to an example embodiment.
Figure 7:
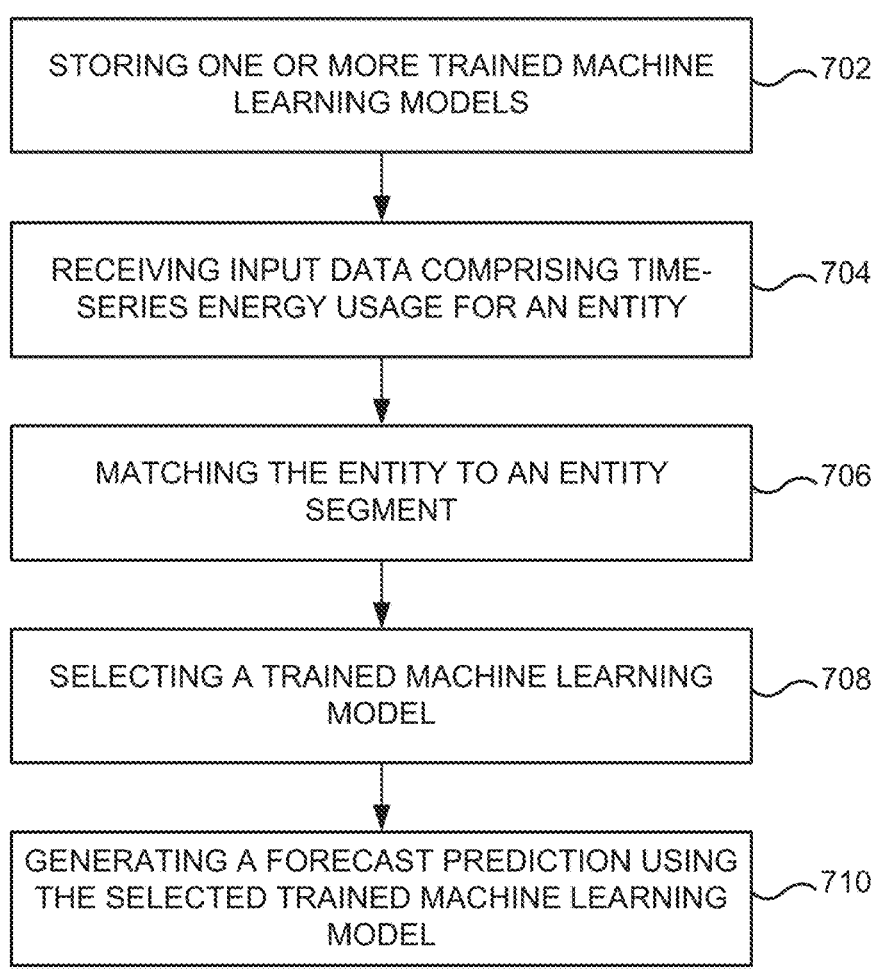

FIG. 7 illustrates a flow diagram for generating time-series energy usage forecast predictions for energy consuming entities according to an example embodiment. In some embodiments, the functionality of FIG. 7 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 7 can be performed by one or more elements of system 200 of FIG. 2.

At 702, one or more trained machine learning models can be stored. For example, multiple trained machine learning models can be stored, where each corresponds to an entity segment organized according to an organizational structure.

Each machine learning model can be trained to forecast time-series energy usage data for an entity segment. For example, a given entity segment can comprise a subcategory that categorizes energy consuming entities, and the machine learning model that corresponds to the entity segment can be trained using training data (e.g., energy usage data values) from energy consuming entities that fall into the subcategory.

Accordingly, this particular machine learning model can effectively generate forecast predictions for energy consuming entities that fall into the given entity segment/subcategory. A plurality of machine learning models can be trained to effectively forecast for energy consuming entities that fall into a plurality of entity segments/subcategories. In some embodiments, the machine learning models can comprise components from one or more neural network architectures, such as layers or blocks of a RNN, layers or blocks of an CNN, mixed architecture layers or blocks, and the like.

In some implementations, the entity segments are organized according to an organizational structure that comprises a plurality of enterprise type categories, and the organizational structure comprises hierarchical structures under at least a portion of the enterprise type categories. For example, the hierarchical structures under a given enterprise type category can further subcategorize the enterprise type. In some implementations, each entity segment corresponds to an enterprise type category or a leaf-node of the organizational structures.

In some implementations, the hierarchical structures under each of the portion of the enterprise type categories are organized according to one or more enterprise parameters with respect to each enterprise type category. For example, the enterprise parameters comprise one or more of enterprise sub-types, enterprise size, or goods or services for sale.

At 704, input data including time-series energy usage data for an energy consuming entity can be received. For example, time-series energy usage data for an energy consuming entity can be metered electricity usage at an enterprise location (e.g., coffee shop, grocery store, big box store, etc.). The granularity for the time-series energy usage data can include hourly, daily, and the like. In some embodiments, the time-series energy usage data for the energy consuming entity can cover a predetermined period of time (e.g., weeks, 1 month, 3 months, 6 months, 1 year, years, and the like).

In some embodiments, static features about the energy consuming entity can also be received and/or retrieved. The static features can include enterprise location features (e.g., square footage, etc.), and other suitable static features. In some embodiments, weather data about the weather forecast expected for the energy consuming entity over the time horizon of the forecast can be received (e.g., temperature or temperature ranges, precipitation, humidity, dew point, pressure, and the like).

At 706, the energy consuming entity can be matched to an entity segment. For example, an enterprise type category from the organizational structure can be selected that matches attributes of the energy consuming entity. The attributes of the energy consuming entity can include business type, product/service type (e.g., coffee sales, food sales, etc.), square footage, customer traffic metrics, revenue/sales metrics, location information (e.g., city and state), and the like. Once a category is selected for the energy consuming entity, next the matching can include: a) matching the enterprise category to the energy consuming entity when the category does not comprise a hierarchical structure; or b)

traversing the hierarchical structure under the selected enterprise category using attributes of the energy consuming entity until a matching leaf-node is reached. In both scenarios, the matching enterprise category or leaf-node correspond to an entity segment, and the entity segment corresponds to a trained machine learning model.

For example, when the selected enterprise type category corresponds to a hierarchical structure, the hierarchical organizational structure of the selected enterprise type category can be traversed using the attributes of the energy consuming entity until reaching a leaf node. In another example, when the selected enterprise type category does not correspond to a hierarchical structure, the matching enterprise type category can be selected.

At 708, a trained machine learning model can be selected for the energy consuming entity based on the matching entity segment. For example, a trained machine learning model can be selected that corresponds to the matched entity segment. In this example, the selected trained machine learning model is trained using training data that makes it effective at generating time-series energy usage forecast predictions for the energy consuming entity/input data. The trained machine learning models can be trained using training data from energy consuming entities that match the trained machine learning models' entity segment.

At 710, a time-series forecast prediction can be generated using the selected trained machine learning model and the input data. For example, the generated forecast prediction comprises a daily energy usage forecast over a period of time, and the period of time comprises 1 day, 2 days, 7 days, 14 days, or 21 days. In some implementations, the forecast prediction comprises at least a 90% accuracy with respect to an observed energy usage for the energy consuming entity over the period of time. The forecast prediction (or multiple forecast predictions generated by one or more the trained machine learning models) can be used to perform energy usage planning for the energy consuming entity or energy grid planning.

Embodiments relate to generating time-series energy usage forecast predictions for energy consuming entities. Machine learning model(s) can be trained to forecast energy usage for a variety of different energy consuming entities. For example, a local coffee shop location and a large grocery store location are both considered retail locations, however their energy usage over days or weeks may differ significantly. The local coffee shop and large grocery store can comprise different energy consuming devices, operating hours, and other factors that influence energy consumption patterns. Embodiments organize energy consuming entities into different entity segments and store trained machine learning models that forecast energy usage for each of these individual entity segments. For example, a given machine learning model that corresponds to a given entity segment can be trained using energy usage data for entities that match the given entity segment. A forecast manager can generate a forecast prediction for a new energy consuming entity by matching the entity to a given entity segment and generating the forecast prediction using the entity segment's corresponding trained machine learning model. This approach can achieve accurate forecast predictions for a variety of different energy consuming entities.

The entity segments can be organized according to an organizational structure. For example, the organizational structure can be broken into enterprise categories, such as grocery store, general store, big box store, food or beverage retail location, etc. Under at least a portion of the enterprise categories, the organizational structure can comprise further hierarchical structures. For example, under the food and beverage enterprise type, the hierarchy can include "food and beverage" as a root node, and one or more child nodes that correspond to other attributes for a food and beverage retail location, such subtypes (e.g., food, beverage, food and beverage), specialty subtypes (e.g., coffee shop, ice cream shop, bar/night club, etc.), and the like.

In another example, under the grocery store enterprise type, the hierarchy can include 'grocery store' as a root node, and one or more child nodes that correspond to other attributes for a grocery store, such as size (e.g., square footage, revenue or sales metric, foot traffic metric, or any other suitable size metric), automation level (e.g., automated checkout via computer vision models and customer tracking, conventional checkout, etc.), and the like. With respect to the organizational structure, entity segments can correspond to an individual enterprise category (e.g., when the category does not correspond to a hierarchical structure) or the leaf-nodes of the hierarchical structures. For example, under the food and beverage enterprise category, the specialty subcategories "coffee shop" and "ice cream shop" can comprise leaf-nodes, and thus "coffee shop" and "ice cream shop" can each comprise entity segments.

When generating a forecast for a new energy consuming entity, the attributes of the energy consuming entity can be matched to an entity segment. The matching can include selecting an enterprise category for the energy consuming entity. Next, the matching can include: a) matching the enterprise category to the energy consuming entity when the category does not comprise a hierarchical structure; or b) traversing the hierarchical structure under the selected enterprise category using attributes of the energy consuming entity until a matching leaf-node is reached. In both scenarios, the matching enterprise category or leaf-node correspond to an entity segment, and the entity segment corresponds to a trained machine learning model.

The forecast manager can generate the forecast for the new energy consuming entity using the trained machine learning model that corresponds to the matching entity segment. For example, historical energy usage (e.g., comprising a daily granularity) by the new energy consuming entity over a period of time (e.g., week, weeks, months, etc.) can be input to the trained machine learning model to generate a time-series energy usage forecast. The generated time-series energy usage forecast can cover a period of time (e.g., 1 day, 2 days, 7 days, 14 days, 21 days, etc.) and comprise any suitable granularity (e.g., daily). Because the trained machine learning model that generates the forecast is specifically selected to match the characteristics of the new energy consuming entity, implementations can achieve improved forecasting accuracy for a variety of energy consuming entities.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for generating time-series energy usage forecast predictions for energy consuming entities, the method comprising:

training a plurality of machine learning models, each machine learning model corresponding to an entity segment, the training of each machine learning model comprising receiving historical energy usage data for entities that match the corresponding entity segment using training data from energy consuming entities that match the trained machine learning model's entity segment;

receiving input data comprising historical time-series energy usage data for an energy consuming entity;

matching the energy consuming entity to one of the entity segments;

selecting one of the trained machine learning models that corresponds to the matched entity segment;

generating a forecast prediction using the selected trained machine learning model and the input data, wherein the forecast prediction comprises a time-series energy usage forecast for the energy consuming entity over a period of time; and in response to the forecast prediction, configuring a distribution of an electrical load of a utility electrical grid by revising an expected load from an enterprise location.

2. The method of claim 1, wherein the entity segments are organized according to an organizational structure that comprises a plurality of enterprise type categories, and the organizational structure comprises hierarchical structures under at least a portion of the enterprise type categories, further comprising:

based at least on the forecast prediction, configuring a utility electrical grid to meet an expected load.

3. The method of claim 2, wherein each entity segment corresponds to an enterprise type category or a leaf-node of the organizational structures.

4. The method of claim 3, wherein the hierarchical structures under each of the portion of the enterprise type categories are organized according to one or more enterprise parameters with respect to each enterprise type category.

5. The method of claim 4 wherein the enterprise parameters comprise one or more of enterprise sub-types, enterprise size, or goods or services for sale.

6. The method of claim 4, wherein selecting one of the trained machine learning models for the energy consuming entity further comprises:

selecting an enterprise type category that matches attributes of the energy consuming entity, wherein, when the selected enterprise type category corresponds to a hierarchical structure, the hierarchical structure of the selected enterprise type category is traversed using the attributes of the energy consuming entity until reaching a leaf node, and when the selected enterprise type category does not correspond to a hierarchical structure, the matching enterprise type category is selected; and matching the energy consuming entity to an entity segment that corresponds to the selected enterprise type category or leaf-node, wherein the selected one of the trained machine learning models corresponds to the matched entity segment.

7. The method of claim 1, wherein the generated forecast prediction comprises a daily energy usage forecast over a period of time, and the period of time comprises 1 day, 2 days, 7 days, 14 days, or 21 days.

8. The method of claim 7, wherein the forecast prediction comprises at least a 90% accuracy with respect to an observed energy usage for the energy consuming entity over the period of time.

9. The method of claim 1, wherein the forecast prediction is used to perform energy usage planning for the energy consuming entity or energy grid planning.

10. A non-transitory computer readable medium having instructions stored thereon that, when executed by a processor, cause the processor to generate time-series energy usage forecast predictions for energy consuming entities, wherein, when executed, the instructions cause the processor to:

train a plurality of machine learning models, each machine learning model corresponding to an entity segment, the training of each machine learning model comprising receiving historical energy usage data for entities that match the corresponding entity segment using training data from energy consuming entities that match the trained machine learning model's entity segment;

receive input data comprising historical time-series energy usage data for an energy consuming entity;

match the energy consuming entity to one of the entity segments;

select one of the trained machine learning models that corresponds to the matched entity segment;

generate a forecast prediction using the selected trained machine learning model and the input data, wherein the forecast prediction comprises a time-series energy usage forecast for the energy consuming entity over a period of time; and in response to the forecast prediction, configure a distribution of an electrical load of a utility electrical grid by revising an expected load from an enterprise location.

11. The computer readable medium of claim 10, wherein the entity segments are organized according to an organizational structure that comprises a plurality of enterprise type categories, and the organizational structure comprises hierarchical structures under at least a portion of the enterprise type categories, the processer further causing:

based at least on the forecast prediction, configuring a utility electrical grid to meet an expected load.

12. The computer readable medium of claim 11, wherein each entity segment corresponds to an enterprise type category or a leaf-node of the organizational structure.

13. The computer readable medium of claim 12, wherein the hierarchical structures under each of the portion of the enterprise type categories are organized according to one or more enterprise parameters with respect to each enterprise type category.

14. The computer readable medium of claim 13 wherein the enterprise parameters comprise one or more of enterprise sub-types, enterprise size, or goods or services for sale.

15. The computer readable medium of claim 13, wherein selecting one of the trained machine learning models for the energy consuming entity further comprises:

selecting an enterprise type category that matches attributes of the energy consuming entity, wherein, when the selected enterprise type category corresponds to a hierarchical structure, the hierarchical structure of the selected enterprise type category is traversed using the attributes of the energy consuming entity until reaching a leaf node, and when the selected enterprise type category does not correspond to a hierarchical structure, the matching enterprise type category is selected; and matching the energy consuming entity to an entity segment that corresponds to the selected enterprise type category or leaf-node, wherein the selected one of the trained machine learning models corresponds to the matched entity segment.

16. The computer readable medium of claim 10, wherein the generated forecast prediction comprises a daily energy usage forecast over a period of time, and the period of time comprises 1 day, 2 days, 7 days, 14 days, or 21 days.

17. The computer readable medium of claim 16, wherein the forecast prediction comprises at least a 90% accuracy with respect to an observed energy usage for the energy consuming entity over the period of time.

18. A system for generate time-series energy usage forecast predictions for energy consuming entities, the system comprising:

a processor; and a memory storing instructions for execution by the processor, the instructions configuring the processor to:

train a plurality of machine learning models, each machine learning model corresponding to an entity segment, the training of each machine learning model comprising receiving historical energy usage data for entities that match the corresponding entity segment using training data from energy consuming entities that match the trained machine learning model's entity segment;

receive input data comprising historical time-series energy usage data for an energy consuming entity;

match the energy consuming entity to one of the entity segments;

select one of the trained machine learning models that corresponds to the matched entity segment;

generate a forecast prediction using the selected trained machine learning model and the input data, wherein the forecast prediction comprises a time-series energy usage forecast for the energy consuming entity over a period of time; and in response to the forecast prediction, configure a distribution of an electrical load of a utility electrical grid by revising an expected load from an enterprise location.

19. The system of claim 18, wherein the entity segments are organized according to an organizational structure that comprises a plurality of enterprise type categories, and the organizational structure comprises hierarchical structures under at least a portion of the enterprise type categories, wherein each entity segment corresponds to an enterprise type category or a leaf-node of the organizational structure.

20. The system of claim 19, wherein the hierarchical structures under each of the portion of the enterprise type categories are organized according to one or more enterprise parameters with respect to each enterprise type category.

* * * * *